No. 864,351. PATENTED AUG. 27, 1907.
J. ALEXANDER.
MILE REGISTER.
APPLICATION FILED JUNE 27, 1905. RENEWED JULY 23, 1907.

2 SHEETS—SHEET 1.

Witnesses

Inventor
Jesse Alexander
By his Attorneys

No. 864,351.

PATENTED AUG. 27, 1907.

J. ALEXANDER.
MILE REGISTER.
APPLICATION FILED JUNE 27, 1905. RENEWED JULY 23, 1907.

2 SHEETS—SHEET 2.

Witnesses
G. V. Rasmussen
R. S. Allyn

Inventor
Jesse Alexander
By his Attorneys
Banter Bremer Mueller

UNITED STATES PATENT OFFICE.

JESSE ALEXANDER, OF BROOKLYN, NEW YORK.

MILE-REGISTER.

No. 864,351. Specification of Letters Patent. Patented Aug. 27, 1907.

Application filed June 27, 1905, Serial No. 267,195. Renewed July 23, 1907. Serial No. 385,137.

*To all whom it may concern:*

Be it known that I, JESSE ALEXANDER, a citizen of the United States, residing at borough of Brooklyn, Kings county, New York, have invented certain new and useful Improvements in Mile-Registers, of which the following is a full, clear, and exact description.

My invention relates to improvements in registering mechanism, and particularly a mile register for vehicles.

The object of the invention is to provide a simple and accurate construction for registering the movement of a vehicle and indicating the same in a convenient manner.

The invention consists in improvements, the details of which are illustrated in the accompanying two sheets of drawings.

The construction comprises a casing containing the movable parts of the indicating apparatus. Two series of drums are provided for indicating the total distance traveled by the vehicle. These drums are operated by a train of gears, which train is operated by an electro magnet. The circuit from the magnet includes a suitable make and break device controlled by the running gear of the vehicle. The distance traveled is therefore indicated whether the vehicle moves in a forward or backward direction. One of the sets of drums may be disconnected from the train and re-set by simple accessible mechanism.

My invention also comprises improvements in the details of the mechanism whereby the re-setting may be accomplished expeditiously.

Figure 1:
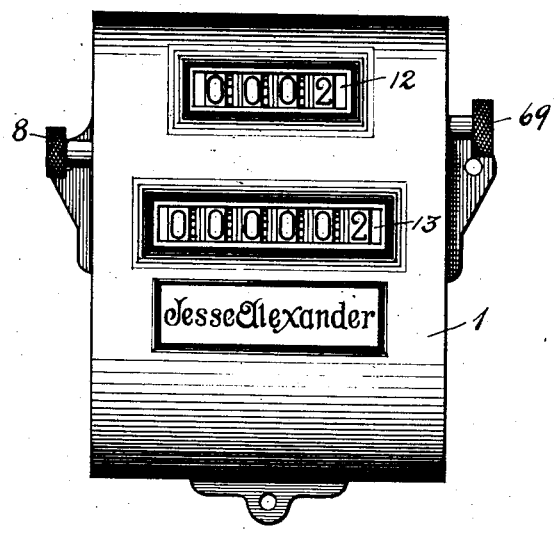
Figure 2:
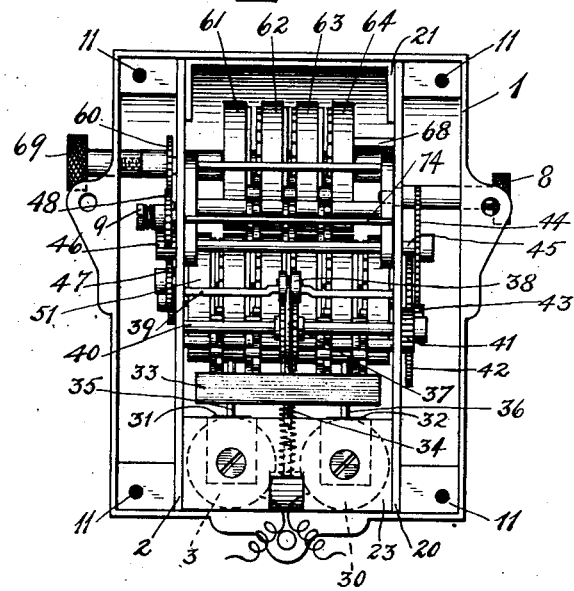
Figure 3:
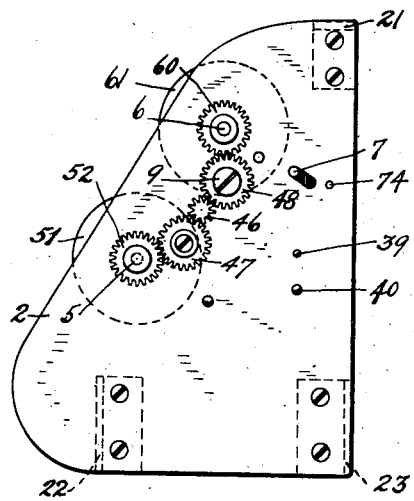
Figure 4:
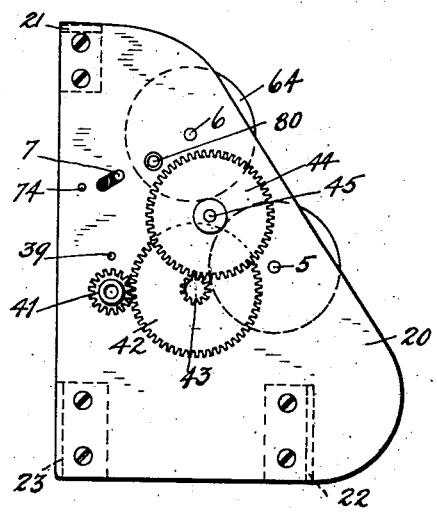
Figure 5:
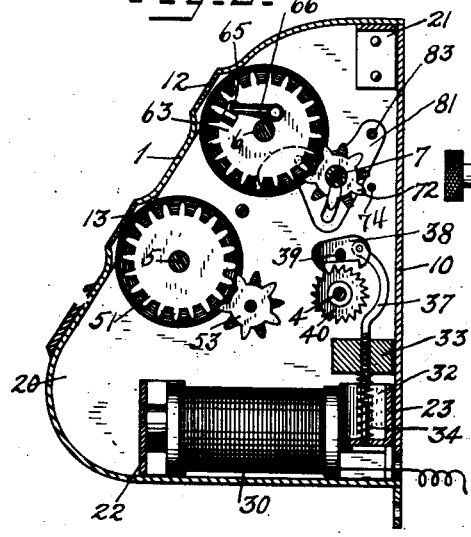
Figure 6:
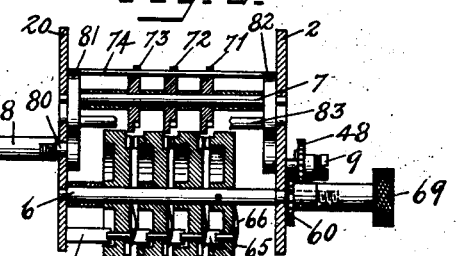
Figures 7, 8:
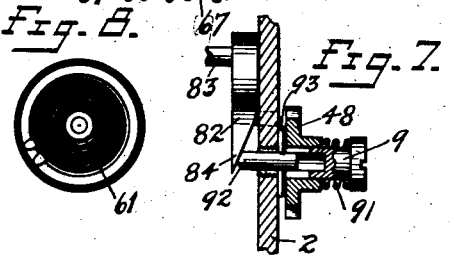

Figure 1 is a front view of a mechanism embodying the improvements of my invention. Fig. 2 is a rear view of the same, the back of the case being removed. Fig. 3 is a view of the right hand side of the mechanism frame and gears. Fig. 4 is a view of the left hand side. Fig. 5 is a sectional view of the right hand side of the mechanism of Fig. 2, (a view from the left as seen in this figure.) Fig. 6 is a sectional view of the upper series of drums. Fig. 7 is an enlarged detail of the releasing gear. Fig. 8 is an end view of one of the indicating drums.

1 is the casing for the mechanism.

10 is the back.

11—11—11—11 are lugs for the attachment of the back. 12 and 13 are openings or windows in the front of the casing.

2 and 20 are the side plates of the frame for carrying the mechanism.

21—22—23 are bars for connecting the frame plates. The frame is guided in the casing by the lugs 11, but may be removed, together with all the operating parts.

3 and 30 are magnet coils.

31 and 32 are the poles of the two magnets.

33 is an armature member.

34 is a spring normally holding the armature in its raised position.

35—36 are pins projecting from the pole pieces 31—32 and serve as guides for the armature member 33.

37 is a rod carried by the armature member 33 and pivotally connected in a slot in the pawl 38.

39 is a shaft pivoted in the frame plates 2—20, and carrying eccentrically of its axis the pawl 38. The shaft 39 is formed with a bend, as shown in Figs. 2 and 5, near the center, and the pawl 38 is mounted rigidly or fixed on the shaft at this point eccentrically of the pivotal axis of the shaft, so that when the armature member 33 is drawn downward by the magnet, the rod 37 rocks the pawl 38 downward as well as forward and the spring 34 causes a reverse movement when the magnet is de-energized.

4 is a ratchet wheel mounted on the shaft 40 directly beneath the pawl 38, which is rotated step by step as the pawl is operated, the pawl normally holding the ratchet stationary, as shown in Fig. 5.

41 is a pinion on the end of the shaft 40 meshing with the gear 42.

43 is a pinion rotating with the gear 42 in mesh with the wheel 44.

45 is the shaft of the gear wheel 44.

46 is a pinion carried by the opposite end of the shaft and in mesh with the two gears 47—48.

5 is the main drum shaft carrying a series of drums 51 &c., for indicating tenths, units, tens, &c., of miles.

52 is a gear on the shaft 5 in mesh with the gear 47 and driven thereby. Movement is transmitted from one drum to the other in this series of main indicating drums through gears 53 in the same manner as hereinafter described in regard to the upper series of drums.

6 is the shaft of the secondary series of drums 61—62—63—64 for indicating miles traveled during a trip. This shaft 6 is driven through gear 60 which is normally in mesh with gear 48. The drum 61 is fast on the shaft 6 and the other drums are loosely mounted but properly held from relative longitudinal movement.

65 is a headed pin projecting through the drum 61 and held in its normal position by a spring 66.

67 is a beveled stud projecting from drum 62 over which the pin 65 may slide when the drum is rotated clockwise, as viewed in Fig. 3, but which intercepts the pin 65 when the drum 61 is rotated in a reverse rotation, thus causing the drums to rotate together when the pin contacts with the back of the stud. Similar pins and studs are provided between the other drums of the series.

68 is a stud projecting from the frame plate 20 for co-action with the pin carried by the loose drum to bring it to rest at the zero position when re-set.

69 is a handle for turning the shaft 6, which handle is preferably screw-threaded onto the shaft 6 and projects through the case 1.

7 is a countershaft carrying a series of star wheels 71—72—73 for transmitting movement between the drums when in engagement therewith.

74 is a stationary rod which engages between the teeth of the star wheels when they are retracted from the drums, for the purpose of holding them from rotary displacement.

8 is a handle projecting outside the casing screw-threaded onto a stud 80 of a release mechanism pivoted in the frame, and consisting of the plates 81 and 82 and a connecting bar 83. The shaft 7 projects through curved cam-like openings in the plates 81 and 82, so that when the handle 8 is partially rotated, the shaft 7 and star wheels 71—72—73 are disengaged from the drums 61—62—63—64.

9 is a screw-threaded post seated in the frame plate 2 and affording a bearing for the gear 48.

91 is a spring normally holding the gear 48 in mesh with the gear 60.

92 is a pin longitudinally slidable within the hollow post 9 and carrying a cross-piece 93, which engages beneath the gear 48. The end of the plate 82 is formed with a bevel or cam surface 84 against which the end of the pin 92 rests. When the handle 8 is partially rotated it tilts the plates 81 and 82 and thus forces the pin 92 outward and disengages the gear 48 from the gear 60. The drums may then be returned to a zero position by rotating the handle 69. This provides a quick and handy means for re-setting the drums after a trip. The lower main series of drums would seldom require re-setting since those herein shown are intended to register up to 99,999.9 miles.

Any suitable form of mechanism may be employed to make and break the electric circuits through the magnets 3 and 30. Each make and break draws down the armature 33 and advances the ratchet 40 through the space of one tooth whether the vehicle is going forward or backward.

What I claim is:

1. In a registering mechanism, the combination of a series of indicating drums, an electromagnet, an armature therefor, a ratchet, a train of driving gears connecting said ratchet and said drums, a pivoted shaft 39, a double toothed pawl 38 carried thereby eccentrically of the pivotal axis thereof, and an operative connection between said armature and said pawl whereby upon the energizing of the magnet the pawl is given a compound movement substantially as described.

2. In a registering mechanism, a rotatable and longitudinally movable shaft, a series of indicating drums mounted thereon, a handle for said shaft, a series of gears for transmitting motion from one drum to the next, a driving train connected normally to one of said drums and release mechanism having a single handle for disengaging said transmitting gears from said drums and disconnecting said driving train.

3. In a registering mechanism, the combination of a series of indicating drums, a train of gears connected thereto, star wheels for transmitting movement from one drum to the next, a shaft for said star wheels, a pivoted frame carrying said shaft and adapted to move the same for disengaging said star wheels, a plate movable with said frame, and means engaging said plate for longitudinally disengaging one of the gears of said train.

4. In a registering mechanism, the combination of two series of indicating drums, a train of gears for driving the first drum of each series of drums, means for transmitting movement from one drum to the next drum in the same series, means for disengaging said transmitting means from one of said series of drums, and means for disconnecting the driving train from the latter series of drums and re-setting said drums without affecting or interrupting the operation of the other series of drums.

5. In a registering mechanism, the combination of a train of reducing gears, a series of registering drums, the first drum being driven from said train, transmitting gears between said drums, a pivoted handle, mechanism controlled thereby for simultaneously disengaging said transmitting gears from said drums and the first drum from said train.

6. In a registering mechanism, the combination of a train of reducing gears, a series of registering drums, the first drum being driven from said train, transmitting gears between said drums, a pivoted handle, mechanism controlled thereby for simultaneously disengaging said transmitting gears from said drums and the first drum from said train, and a single rotating handle for re-setting said drums.

7. In a registering mechanism, two series of registering drums, a train of reducing gears connected to rotate the first drum of each series, transmitting gears for each series of drums, means for releasing the transmitting gears of one series of drums and disengaging the first drum of said series from said train, and means for re-setting said series of drums without affecting the other series of drums.

8. In a registering mechanism, a series of registering drums, a shaft therefor, the first drum being connected to rotate with said shaft, a series of transmitting gears mounted on an axis eccentric of the axis of said drums parallel thereto, a train of gears for rotating said drum shaft, a spring-pressed pawl operable through each drum in a direction parallel to its axis, a beveled shoulder on the adjacent face of the next drum adapted to be engaged by said pawl, a stationary shoulder adapted to be engaged by the pawl on the last drum of the series, means for disengaging said transmitting gears, means for disengaging the drum shaft from said reducing train, and means for rotating said drum shaft backward and re-setting said drums.

JESSE ALEXANDER.

Witnesses:
L. VREELAND,
ROBT. S. ALLYN.